United States Patent
Mizrachi et al.

(10) Patent No.: US 7,167,973 B2
(45) Date of Patent: Jan. 23, 2007

(54) METHOD AND SYSTEM FOR PERFORMING MULTI-TESTS IN PROCESSORS USING RESULTS TO SET A REGISTER AND INDEXING BASED ON THE REGISTER

(75) Inventors: Shay Mizrachi, Hod Hasharon (IL); Gilad Ayalonn, Hod Hasharon (IL)

(73) Assignee: Broadcom Corporation, Irvine, CA (US)

( * ) Notice: Subject to any disclaimer, the term of this patent is extended or adjusted under 35 U.S.C. 154(b) by 538 days.

(21) Appl. No.: 10/298,247

(22) Filed: Nov. 15, 2002

(65) Prior Publication Data
US 2003/0135721 A1 Jul. 17, 2003

Related U.S. Application Data

(60) Provisional application No. 60/335,381, filed on Nov. 15, 2001.

(51) Int. Cl.
G06F 9/42 (2006.01)
(52) U.S. Cl. ........................ 712/236; 712/234
(58) Field of Classification Search ............... 712/234, 712/236
See application file for complete search history.

(56) References Cited

U.S. PATENT DOCUMENTS

| | | | | |
|---|---|---|---|---|
| 3,577,189 A | * | 5/1971 | Cocke et al. | 712/219 |
| 5,045,993 A | * | 9/1991 | Murakami et al. | 712/236 |
| 5,524,222 A | * | 6/1996 | Hervin | 712/245 |
| 5,659,722 A | * | 8/1997 | Blaner et al. | 712/234 |
| 5,815,695 A | * | 9/1998 | James et al. | 712/220 |
| 5,850,553 A | * | 12/1998 | Schlansker et al. | 717/155 |

* cited by examiner

Primary Examiner—Eddie Chan
Assistant Examiner—Ryan Fiegle
(74) Attorney, Agent, or Firm—McAndrews, Held & Malloy, Ltd.

(57) ABSTRACT

A microprocessor, including a plurality of registers and an instruction execution module which is adapted to process a sequence of conditional tests. The module uses an instruction set that has the following instructions:

A test-and-condition instruction which evaluates each of the conditional tests as true or false and responsive thereto sets respective values in the registers.

A priority-test-branch instruction, which causes the instruction execution module, responsive to one of the conditional tests evaluating as true and to the respective values in the registers, to execute a priority code module.

A combination-test-branch instruction, which causes the instruction execution module, responsive to evaluations of the conditional tests and to the respective values in the registers, to execute a combination code module.

44 Claims, 4 Drawing Sheets

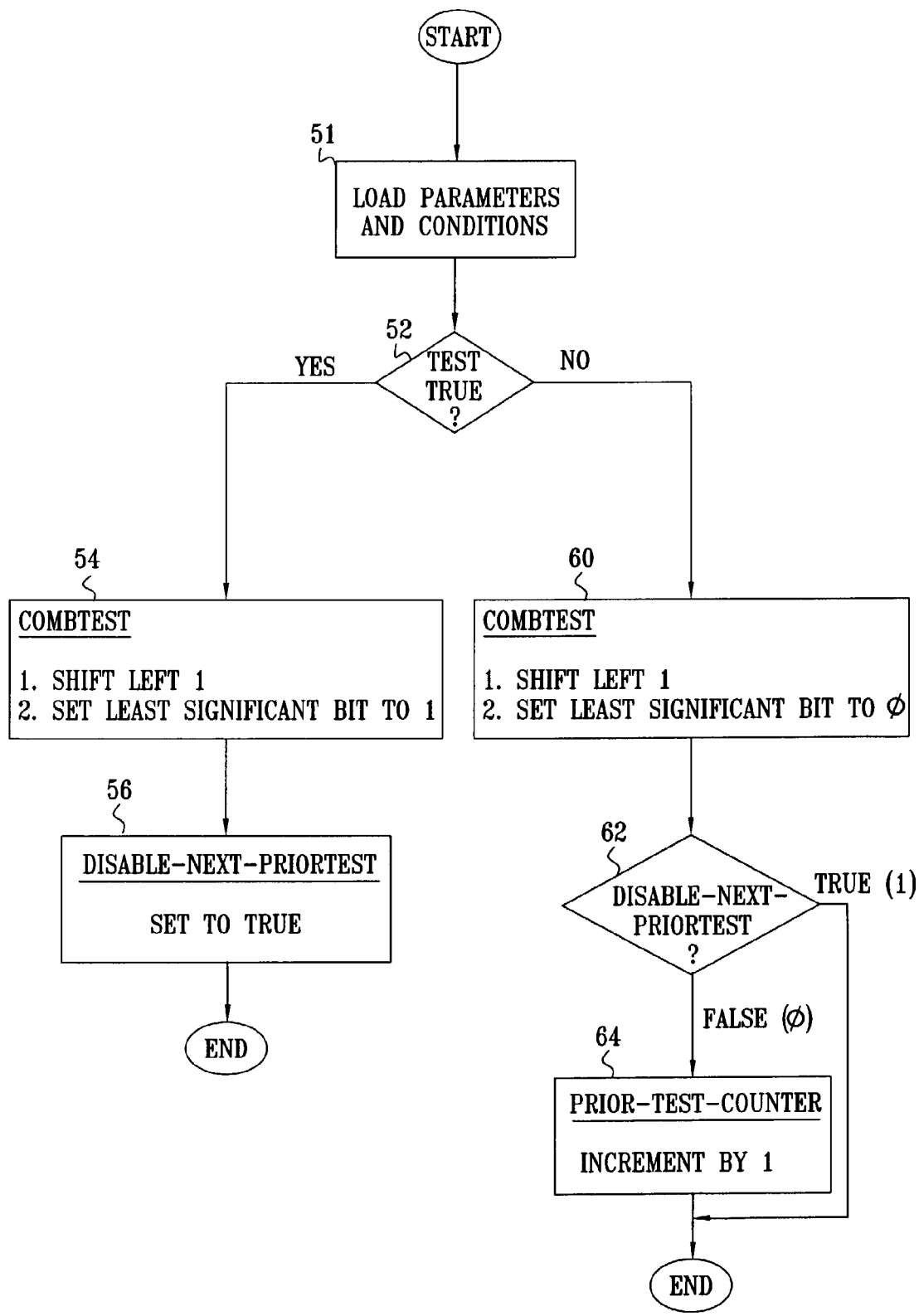

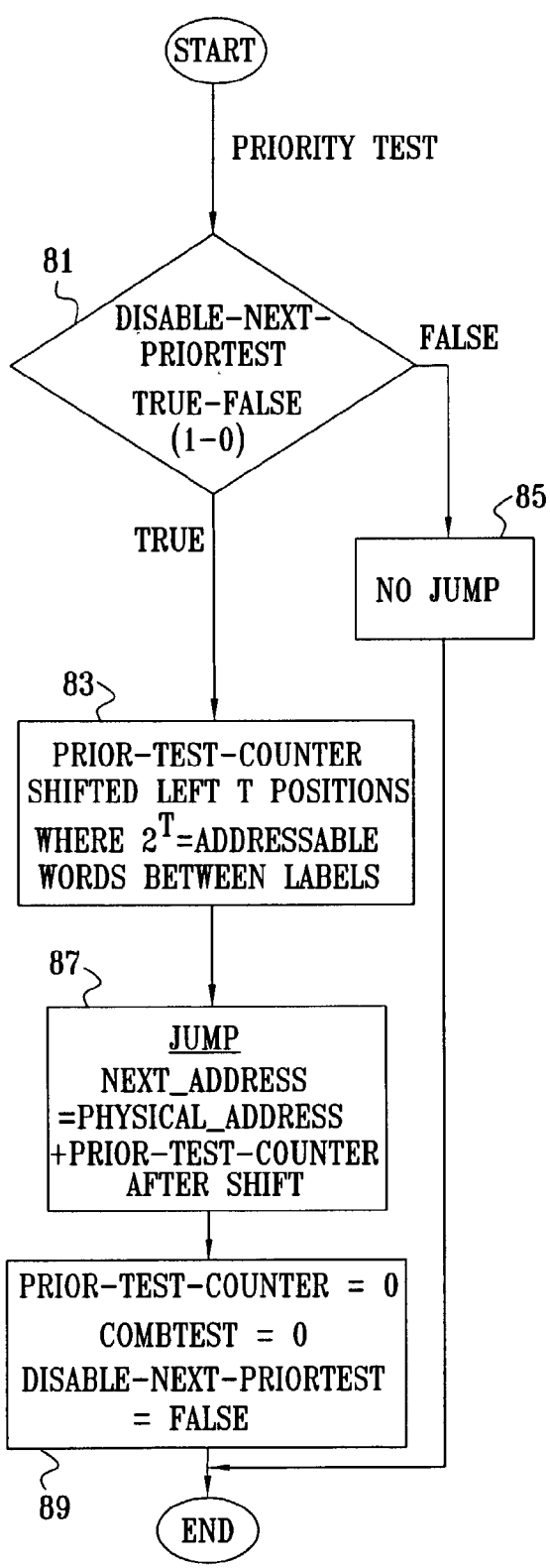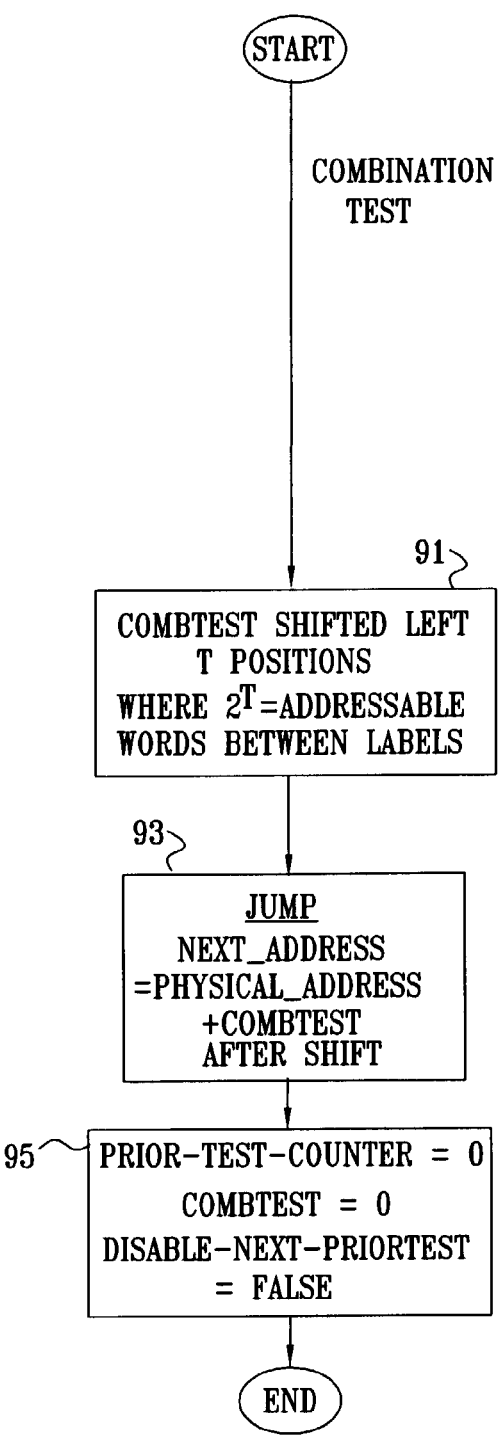

METHOD AND SYSTEM FOR PERFORMING MULTI-TESTS IN PROCESSORS USING RESULTS TO SET A REGISTER AND INDEXING BASED ON THE REGISTER

CROSS-REFERENCE TO RELATED APPLICATIONS

This application claims the benefit of U.S. Provisional Patent Application No. 60/335,381 filed Nov. 15, 2001, which is incorporated herein by reference.

FIELD OF THE INVENTION

The present invention relates generally to computer processors and specifically to branch instructions implemented by computer processors.

BACKGROUND OF THE INVENTION

In typical hardware implementations of a computer instruction set, it has been established that conditional branch instructions use a relatively high number of processing cycles, making their usage expensive.

Branch processing overhead is especially evident when a sequence of tests (herein termed a multi-test) is performed. Additional overhead occurs because each test is logically associated with a separate block of code to be executed if the result of the test is TRUE. When the result is TRUE, a conditional branch is issued to a label preceding the block of code. At the end of the block of code an additional branch is issued to a label associated with the end of the code for the multi-test.

This can be seen in the following example.
Given the following pseudo-code:
If (a>b) & (a>c) & (a>d) then do block 1
If (a>b) & (a>c) & (a<=d) then do block 2
If (a>b) & (a<=c) & (a>d) then do block 3
If (a>b) & (a<=c) & (a<=d) then do block 4
If (a<=b) & (a >c) & (a >d) then do block 5
If (a<=b) & (a >c) & (a <=d) then do block 6
If (a<=b) & (a <=c) & (a >d) then do block 7
If (a<=b) & (a <=c) & (a <=d) then do block 8
Table I is a listing of an assembly implementation of this pseudo-code, typical of the prior art:

TABLE I

```
Test A,B
Jmp if greater to label1
Test A,C
Jmp if greater to label2
Test A,D
Jmp if greater to label3
; place code for case of !(A>B) and !(A>C) and !(A>D) here
    :
    :
jmp end
label1:
Test A,C
Jmp if greater to label11
Test A, D
Jmp if greater to label12
; place code for case of (A>B) and !(A>C) and !(A>D) here
    :
    :
jmp end
label11:
Test A,D
```

TABLE I-continued

```
Jmp if greater to label111
; place code for case of (A>B) and (A>C) and !(A>D) here
    :
    :
jmp end
label111:
; place code for case of (A>B) and (A>C) and (A>D) here
    :
    :
jmp end
label112:
; place code for case of (A>B) and !(A>C) and (A>D) here
    :
    :
jmp end
label2:
Test A, D
Jmp if greater to labe21
; place code for case of !(A>B) and (A>C) and !(A>D) here
    :
    :
jmp end
labe21:
; place code for case of !(A>B) and (A>C) and (A>D) here
    :
    :
jmp end
label3:
; place code for case of !(A>B) and !(A>C) and (A>D) here
    :
    :
end:
```

There are seven conditional branch instructions required in this sample code listing. A conditional branch instruction not taken typically uses one cycle, while a taken branch instruction typically uses three cycles, making branch instructions relatively expensive in terms of processor cycles. A multi-test typically leads to a high number of branch instructions and a system that reduces the number of branches would yield significant processing savings.

Furthermore, the problem of large numbers of branches is particularly acute in processors that implement pipelining, wherein multiple instructions are processed in parallel. While pipelining offers significant performance advantages for most of the instruction set, performing branch instructions in pipelines can degrade performance.

SUMMARY OF THE INVENTION

The present invention seeks to provide faster processing of branch instructions in a multi-test. By modifying a microprocessor architecture, the number of cycles needed to process the multi-test in typical applications is significantly reduced. The modification comprises adding certain instructions and registers to the microprocessor architecture.

Preferred embodiments of the present invention support two types of multi-test, a priority test and a combination test. The multi-test is termed a priority test if only one do-block, the do-block corresponding to a first condition of the multi-test that tests as true, is executed. If the do-block associated with each condition of the multi-test testing true is executed, then the multi-test is termed a combination test.

In one embodiment of the present invention, the microprocessor architecture is modified by the addition of instructions Test-And-Condition, Priority-Test-Branch and Combination-Test-Branch, and by the addition of registers Prior-Test-Counter-Register and Combtest-Register. Prior-Test-Counter-Register includes a flag Disable-Next-Priortest-Flag.

The Test-And-Condition instruction is executed for every test of the multi-test. The instruction updates values in the registers, and of the flag, according to the test result (true or false) determined for each test of the multi-test. The Priority-Test-Branch instruction or the Combination-Test-Branch instruction is then executed, according to the type of test to be performed.

The Priority-Test-Branch instruction evaluates a state of the Disable-Next-Priortest-Flag. If the flag is true, the Prior-Test-Counter-Register is updated by being shifted a predetermined number of places. Execution of the instruction concludes by jumping to an address determined by the updated Prior-Test-Counter-Register value, and evaluating code at and subsequent to the address.

The Combination-Test-Branch instruction updates the Combtest-Register by shifting the register a predetermined number of places. Execution of the instruction concludes by jumping to an address determined by the updated Combtest-Register value, and evaluating code at and subsequent to the address.

By testing all the conditions first in Test-And-Condition instructions, preferred embodiments of the present invention differ from implementations of multi-tests known in the art wherein each condition and its associated do-block is implemented sequentially. In this manner, the present invention substantially reduces the number of processing cycles required by the microprocessor to perform most multi-tests.

There is therefore provided, according to a preferred embodiment of the present invention, a microprocessor, including:

a plurality of registers; and an instruction execution module, which is adapted to process a sequence of conditional tests, using an instruction set that includes the following instructions:

a test-and-condition instruction, which evaluates each of the conditional tests as true or false and responsive thereto sets respective values in the registers;

a priority-test-branch instruction, which causes the instruction execution module, responsive to one of the conditional tests evaluating as true and to the respective values in the registers, to execute a priority code module; and a combination-test-branch instruction, which causes the instruction execution module, responsive to evaluations of the conditional tests and to the respective values in the registers, to execute a combination code module.

Preferably, at least one of the conditional tests includes an expression a>b, a<b, or a=b, where a and b are terms evaluated by the microprocessor.

Preferably, the registers include a combtest-register, and the test-and-condition instruction implements a modification of contents of the combtest-register for each conditional test having a result true, wherein the modification includes shifting the contents left by one bit and setting a least significant bit of the contents to one.

Further preferably, the registers include a combtest-register, and the test-and-condition instruction implements a modification of contents of the combtest-register for each conditional test having a result false, wherein the modification includes shifting the contents left by one bit and setting a least significant bit of the contents to zero.

Preferably, the registers include a priortest-counter-register, and the test-and-condition instruction implements a modification of contents of the priortest-counter-register for each conditional test having a result false, wherein the modification includes incrementing the contents by one. Preferably, the priortest-counter-register includes a disable-next-priortest-flag and for each conditional test having the result true the disable-next-priortest-flag is set to one.

Preferably, the microprocessor includes a reduced instruction set computer (RISC) processor, and the RISC processor implements pipelining.

Preferably, the registers include a combtest-register having contents shifted left by a whole number t, the combination code module has a combination-code-module address, the combination-test-branch instruction executes a jump to the combination-code-module address, and the combination-code-module address comprises a predetermined function of the whole number t.

Further preferably, the respective value of the contents is zero and the combination-test-branch instruction and the combination-code-module address are consecutive. Preferably, the predetermined function includes $2^t$.

Preferably, the registers include a prior-test-counter-register having contents shifted left by a whole number t, the priority code module has a priority-code-module address, the priority-test-branch instruction executes a jump to the priority-code-module address, and the priority-code-module address includes a predetermined function of the whole number t. Further preferably, the respective value of the contents is zero and the combination-test-branch instruction and the combination-code-module address are consecutive. Preferably, the predetermined function includes $2^t$.

Preferably, the test-and-condition instruction includes a first test-and-condition instruction and a second test-and-condition instruction which are non-contiguous and which evaluate respective conditional tests chosen from the sequence of conditional tests.

Preferably, the test-and-condition instruction includes a first test-and-condition instruction and a second test-and-condition instruction which are contiguous and which evaluate respective conditional tests chosen from the sequence of conditional tests. Further preferably, the first test-and-condition instruction and the second test-and-condition instruction are written as a single multi-test-and-condition instruction which sequentially evaluates the respective conditional tests.

There is further provided, according to a preferred embodiment of the present invention, a method for processing a sequence of conditional tests in a microprocessor having registers, the method including:

evaluating each of the conditional tests as true or false and responsive thereto setting respective values in the registers;

if the sequence of conditional tests is a priority test, then responsive to one of the conditional tests evaluating as true and to the respective values in the registers, executing a priority code module; and if the sequence of conditional tests is a combination test, then responsive to evaluations of the conditional tests and to the respective values in the registers, executing a combination code module.

Preferably, at least one of the conditional tests includes an expression a>b, a<b, or a=b, where a and b are terms evaluated by the microprocessor.

Preferably, the registers include a combtest-register, and the method includes, for each conditional test having a result true, shifting contents of the combtest-register left by one bit and setting a least significant bit of the contents to one.

Preferably, the registers include a combtest-register, and the method includes, for each conditional test having a result false, shifting contents of the combtest-register left by one bit and setting a least significant bit of the contents to zero.

Preferably, the registers include a priortest-counter-register, and the method includes, for each conditional test having a result false, incrementing contents of the priortest-counter-register by one.

Further preferably, the priortest-counter-register includes a disable-next-priortest-flag, and the method includes setting the disable-next-priortest-flag to one for each conditional test having the result true.

Preferably, the microprocessor includes a reduced instruction set computer (RISC) processor, and the RISC processor implements pipelining.

Preferably, the registers include a combtest-register having contents shifted left by a whole number t, the combination code module has a combination-code-module address having a predetermined function of the whole number t, and the method includes executing a jump to the combination-code-module address. Further preferably, the respective value of the contents is zero and the combination-test-branch instruction and the combination-code-module address are consecutive.

Preferably, the predetermined function includes $2^t$.

Preferably, the registers include a prior-test-counter-register having contents shifted left by a whole number t, the priority code module has a priority-code-module address including a predetermined function of the whole number t, and the method includes executing a jump to the priority-code-module address.

Preferably, the respective value of the contents is zero and the priority-test-branch instruction and the priority-code-module address are consecutive. Further preferably, the predetermined function includes $2^t$.

Preferably, evaluating each of the conditional tests as true or false includes evaluating at least two of the conditional tests as if the tests are non-contiguous.

Preferably, evaluating each of the conditional tests as true or false includes evaluating at least two of the conditional tests as if the tests are contiguous. Further preferably, evaluating each of the conditional tests includes incorporating the at least two of the conditional tests into a single multi-test-and-condition instruction which sequentially evaluates the respective conditional tests.

The present invention will be more fully understood from the following detailed description of the preferred embodiments thereof, taken together with the drawings in which:

BRIEF DESCRIPTION OF THE DRAWINGS

FIG. 3 is a flow chart that schematically illustrates a process implemented by a Test-And-Condition instruction, in accordance with a preferred embodiment of the present invention; and FIG. 4 is a flow chart showing steps taken if code processed by the microprocessor of FIG. 1 comprises a Priority-Test-Branch instruction, in accordance with a preferred embodiment of the present invention; and FIG. 5 is a flow chart showing steps taken if code processed by the microprocessor of FIG. 1 comprises a Combination-Test-Branch instruction, in accordance with a preferred embodiment of the present invention.

DETAILED DESCRIPTION OF PREFERRED EMBODIMENTS

Figure 1:
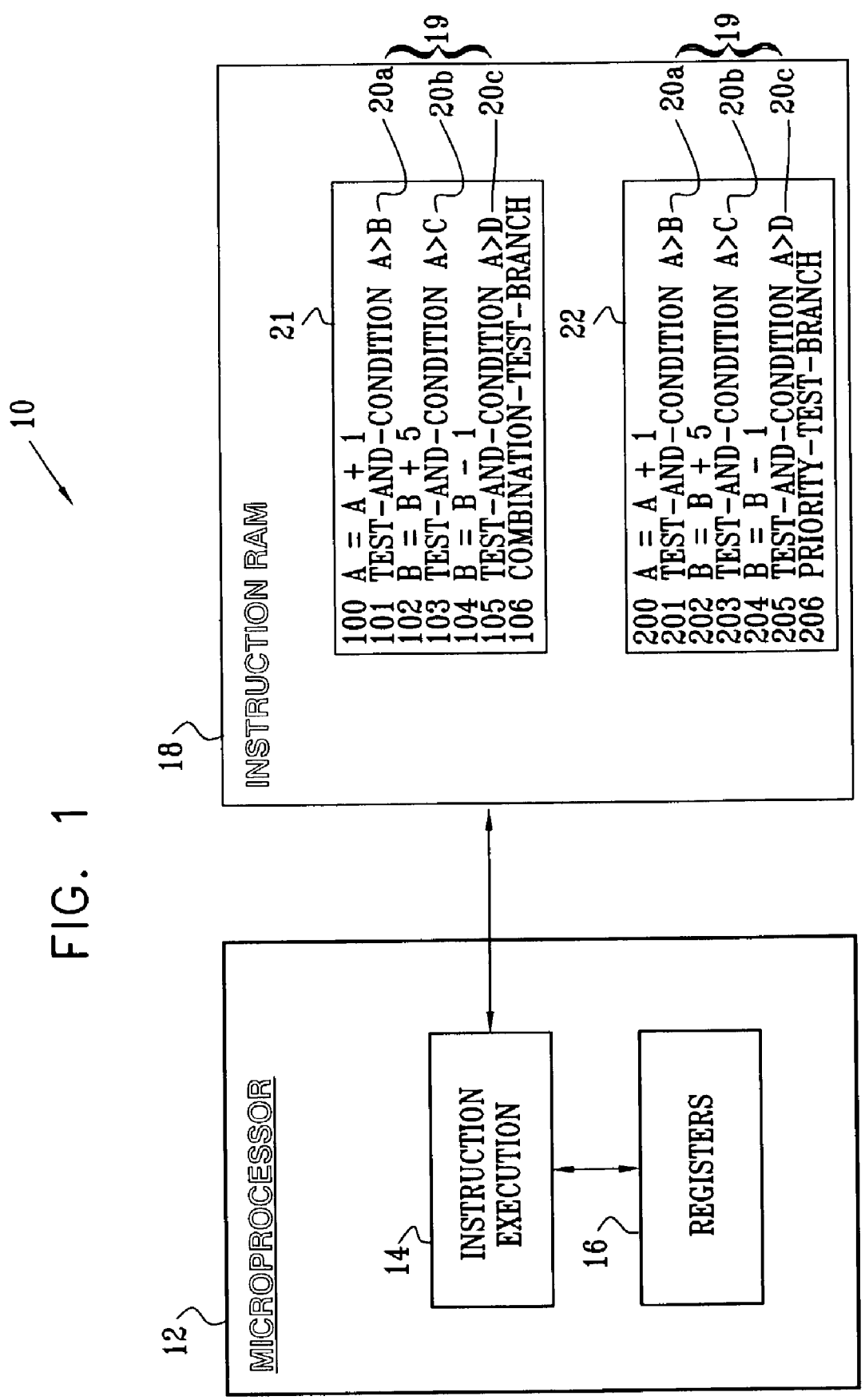
FIG. 1 is a block diagram that schematically illustrates a microprocessor, in accordance with a preferred embodiment of the present invention.

FIG. 1 is a block diagram that schematically illustrates an architecture 10 of a microprocessor and memory configuration, according to a preferred embodiment of the present invention. Architecture 10 includes a microprocessor 12, which comprises an instruction execution module 14 and a register set 16. Microprocessor 12 is most preferably implemented as a custom or semi-custom device, for example, as an application specific integrated circuit (ASIC). The instruction execution module uses the registers as its primary data area for all instructions that require a data area. The instruction execution module fetches instructions from and updates an instruction random access memory (RAM) 18.

RAM 18 has two sets of instructions 21 and 22. Instruction sets 21 and 22 comprise instructions at addresses 100–106 and 200–206 respectively, and except for instruction 106 and 206, sets 21 and 22 are substantially similar. Addresses 101, 103, 105, and 201, 203, 205 comprise a Test-And-Condition instruction applied to test 20a A>B, test 20b A>C, and test 20c A>D. The tests are also referred to collectively hereinbelow as tests 20. The Test-And-Condition instruction is described in more detail below. The multiple sequence of tests 20 to which the Test-And-Condition instruction is applied is termed multi-test 19. Two types of operation may be applied to multi-test 19—a combination multi-test, also termed herein a combination test, and a priority multi-test, also termed herein a priority test.

In a combination test each do-block of every test (in multi-test 19) that is true is executed. The following pseudo-code shows how a combination test is implemented:

If a>b then perform do-block 1 and return;
If a>c then perform do-block 2 and return;
If a>d then perform do-block 3 and return;

Since execution of any do-block is accompanied by a subsequent return of control, all three do-blocks associated with conditions a>b, a>c, a>d are executed when their respective condition is true, regardless of the outcome of the previous tests.

In a priority test the only do-block performed is that of the first test of multi-test 19 whose result is true. The following pseudo-code shows how a priority test is implemented:

If a>b then perform do-block 1 and branch to end of the multi-test;
If a>c then perform do-block 2 and branch to end of the multi-test;
If a>d then perform do-block 3 and branch to end of the multi-test;

Since execution of any do-block is accompanied by a subsequent branch of control to a label immediately following the multi-test, only the first do-block whose condition is true is executed.

Instruction set 21 comprises a Priority-Test-Branch instruction and comprises an example of a priority test. Instruction set 22 comprises a Combination-Test-Branch instruction and comprises an example of a combination test. The instructions Priority-Test-Branch and Combination-Test-Branch are described in more detail below.

By way of example, multi-test 19 is assumed to comprise the three tests 20a, 20b, and 20c listed above, although it will be appreciated that the multi-test may comprise substantially any plurality of tests, each having a result true or false, the tests being of any type supported by the basic instruction set. It will be appreciated that each test may comprise an expression of the form a>b, a=b, a<b, or a combination of such expressions or similar expressions, where a, b, are terms that may be evaluated by microprocessor 12.

Figure 2:
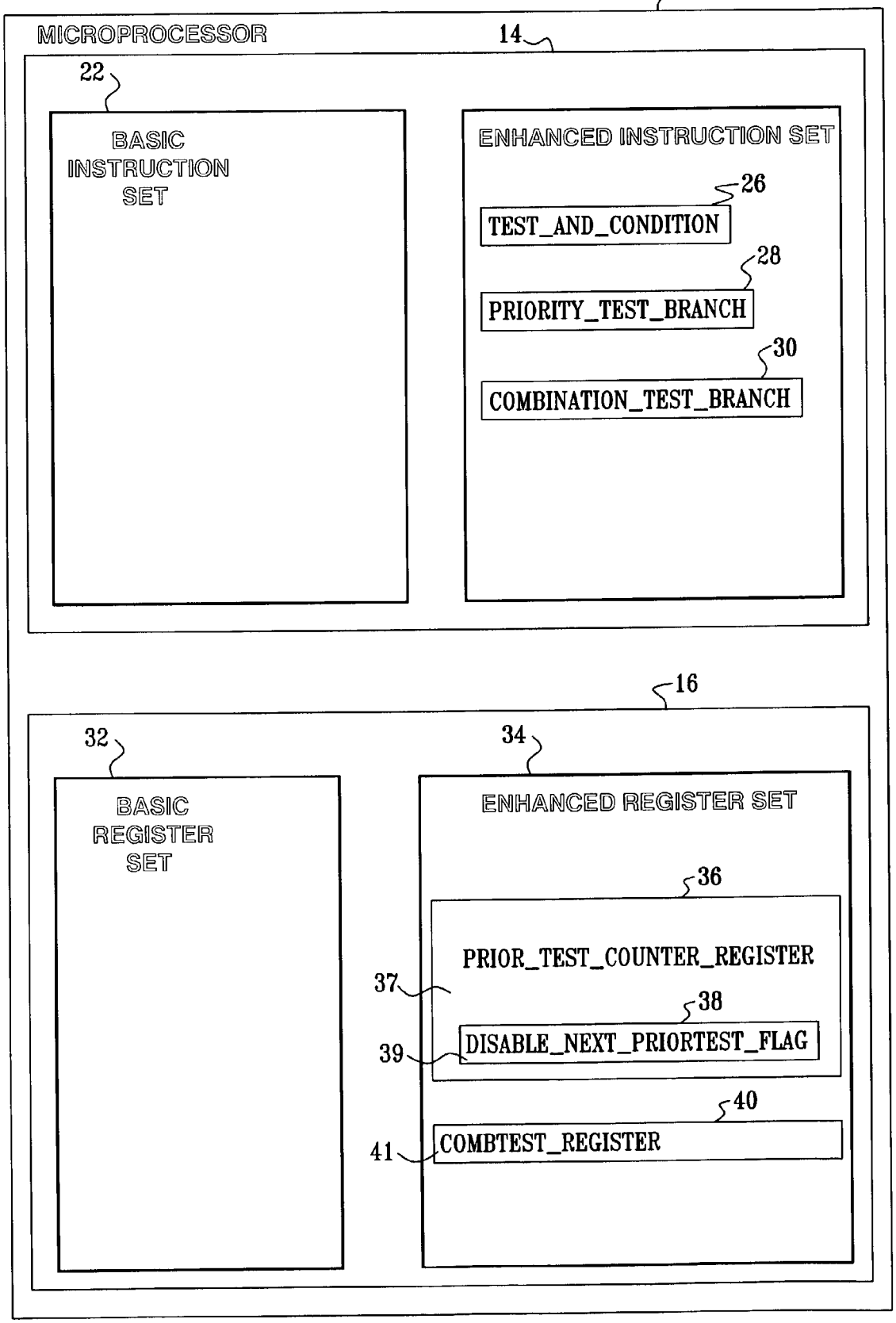
FIG. 2 is a block diagram that schematically illustrates the microprocessor in further detail, in accordance with a preferred embodiment of the present invention.

FIG. 2 is a block diagram that schematically illustrates microprocessor 12 in more detail, according to a preferred embodiment of the present invention. Instruction execution module 14 comprises a basic instruction set 22 and an enhanced instruction set 24. The basic instruction set most preferably comprises instructions known in the art, such as those comprised in a reduced instruction set computer (RISC). The enhanced instruction set comprises three instructions, a Test-And-Condition instruction 26, a Priority-Test-Branch instruction 28, and a Combination-Test-Branch instruction 30. Register set 16 comprises a basic register set 32, and an enhanced register set 34. The basic register set most preferably comprises registers known in the art. The enhanced register set comprises two registers, a Prior-Test-Counter-Register 36 and a Combtest-Register 40 having respective contents Prior-Test-Counter 37 and Combtest 41. The Prior-Test-Counter-Register includes a single flag bit 38 termed Disable-Next-Priortest-Flag having a value Disable-Next-Priortest 39. The functions and method of operations of sets 24 and 34 are described in more detail hereinbelow.

FIG. 3 is a flow chart that schematically illustrates a process implemented by Test-And-Condition instruction 26 of microprocessor 12, according to a preferred embodiment of the present invention. Prior to implementation of instruction 26, typically at startup of the microprocessor, Prior-Test-Counter 37 is set to binary 0s, Disable-Next-Priortest 39 is set to FALSE, and Combtest 41 is set to binary 0s.

In a first step 51, corresponding to lines 101, 103, 105, (FIG. 1) microprocessor 12 loads the parameters and the conditions governing the parameters.

A decision step 52 tests if test 20 is true or false. If the result is TRUE, then in a processing step 54, Combtest 41 is shifted left one position and its least significant bit is set to 1. In a processing step 56, Disable-Next-Priortest 39 is set to TRUE. Test-And-Condition instruction 26 then completes.

If decision step 52 is FALSE, then in a processing step 60, Combtest 41 is shifted left one position, and the least significant bit remains 0. In a decision step 62, Disable-Next-Priortest 39 is tested. If Disable-Next-Priortest 39 is FALSE then in a processing step 64 Priortest-Counter 37 is incremented by 1, and the process completes. If decision step 62 is TRUE, the process completes.

FIG. 4 is a flow chart showing steps taken if code processed by microprocessor 12 comprises Priority-Test-Branch instruction 28, according to a preferred embodiment of the present invention. Priority-Test-Branch instruction 28 is implemented after Test-And-Condition instructions 26 have been processed (FIGS. 1 and 3). In a decision step 81, Disable-Next-Priortest 39 is tested as true or false. (As illustrated in the flow chart of FIG. 3, a FALSE state for the Disable-Next-Priortest means that no tests 20 in the multi-test had results TRUE.) If Disable-Next-Priortest 39 is FALSE, then an invocation step "no jump" 85 is performed and normal program execution is continued by branching to a label immediately following the multi-test code sequence.

If in decision step 81, Disable-Next-Priortest 39 is TRUE, then in a processing step 83, Prior-Test-Counter 37 is shifted left t positions, where $2^t$ most preferably comprises the number of addressable words between jump labels. The program code is most preferably written so that the labels beginning each do-block are separated by $2^t$ words, where t is a whole number. Alternatively, the number of addressable words between jump labels is another function of t, and the program code is written according to the function.

In a subsequent processing step 87, a jump is issued to a next_address, given by equation (1).

$$\text{next\_address} = \text{current\_address} + \text{relative\_address} + \text{Prior-Test-Counter after shift} \quad (1)$$

wherein current_address is a program counter, as is known in the art, relative_address is a displacement from the current address to a first branch label, and current_address+relative_address gives the physical address of the first branch label.

In a final step 89, Prior-Test-Counter 37 is set to binary 0s, Disable-Next-Priortest 39 is set to FALSE, Combtest 41 is set to binary 0s, and the flow chart ends.

The block of code that is executed by Priority-Test-Branch instruction 28 is considered to be a priority code module, and it will be understood that the Priority-Test-Branch instruction is a branch instruction that branches to blocks of code according to the values of register Prior-Test-Counter and flag Disable-Next-Priortest.

FIG. 5 is a flow chart showing steps taken if code processed by microprocessor 12 comprises Combination-Test-Branch instruction 30, according to a preferred embodiment of the present invention. Combination-Test-Branch instruction 30 is implemented after Test-And-Condition instructions 26 have been processed (FIGS. 1 and 3). In a processing step 91, Combtest 41 is shifted left t positions, where t is as described above with reference to FIG. 4. In a subsequent processing step 93, a jump is issued to a next-address given by equation (2).

$$\text{Next\_address} = \text{current\_address} + \text{relative\_address} + \text{Combtest after shift} \quad (2)$$

wherein current_address and relative_address have values as defined for equation (1), and current_address+relative_address gives the physical address.

In a final step 95, Prior-Test-Counter 37 is set to binary 0s, Disable-Next-Priortest 39 is set to FALSE, Combtest 41 is set to binary 0s, and the flow chart ends.

The block of code that is executed by Combination-Test-Branch instruction 30 is considered to be a combination code module.

It will be understood that Combination-Test-Branch instruction 30 is a branch instruction that branches to blocks of code according to the value of register Combtest.

Returning to FIG. 3, as an example each test 20 of multi-test 19 is assumed to have the values:

A>B=FALSE
A>C=FALSE
A>D=TRUE

Also, in the code written for implementing multi-test 19, each do-block label is assumed, by way of example, to be 4 addressable words apart, so that t=2.

Table II below shows values of Prior-Test-Counter 37, Combtest 41, and Disable-Next-Priortest 39 after each test 20 has been processed according to the flow chart.

TABLE II

| | State after Step or Test | | |
|---|---|---|---|
| Step/Test | Prior-Test-Counter | Combtest | Disable-Next-Priortest |
| Initial State | 0000 | 0000 | FALSE |
| A > B = FALSE | 0001 | 0000 | FALSE |
| A > C = FALSE | 0010 | 0000 | FALSE |
| A > D = TRUE | 0010 | 0001 | TRUE |

The values of the lowest row of Table II are used prior to following the flow charts of FIG. 4, i.e., when multi-test 19 is a priority test, corresponding to instruction set 22 (FIG. 1), or FIG. 5, i.e., when multi-test 19 is a combination test, corresponding to instruction set 21.

If multi-test 19 comprises a priority test then decision 81 (FIG. 4) is executed. As shown in Table II, Disable-Next-Priortest 39 is TRUE, so that processing step 83 applies. In step 83, Prior-Test-Counter 37 is shifted left 2 positions, and a final value for the counter is 1000 in binary, which is equivalent to decimal 8. Step 87 is then executed giving an address equivalent to the physical address of the first branch label+8. Since do-block labels in the example multi-test sequence are spaced 4 words apart, a jump of 8 words implies branching two do-blocks forward, which results in a branch to the label of do-block 3.

Table III is an example of an assembly implementation illustrating a priority test branch applied to multi-test 19.

TABLE III

```
    Test A, B greater than, using Test-And-Condition
Instruction 26;
    Test A, C greater than using Test-And-Condition
Instruction 26;
    Test A, D greater than using Test-And-Condition
Instruction 26;
      Execute Priority-Test-Branch instruction 28
      ; Place code here for case of !(A>B) and !(A>C) and
!(A>D)
      :
      :
      jmp end
  label1:
      ; Place code here (4 word commands) for case of
(A>B)
      :
      jmp end
  label1+4:
      ; Place code here (4 words) for case of (A>C) and
!(A>B)
      :
      jmp end
  label1+8:
      ; Place code here (4 words) for case of (A>D) and
!(A>B) and !(A>C)
      :
      :
      end:
```

Assuming a branch instruction that is actually taken uses 3 cycles, only 6 cycles are needed (including the jump) for a priority test using the example case of !(A>B) and !(A>C) and (A>D). A microprocessor implementing this priority test by methods known in the art typically requires 8 cycles (including the jump).

Table IV summarizes cycles used for various results of a priority test using the three-test example described hereinabove:

TABLE IV

| Conditions | | | Priority testing | |
|---|---|---|---|---|
| (A > B) | (A > C) | (A > D) | Prior art cycle count | Table III cycle count |
| FALSE | FALSE | FALSE | 6 | 4 |
| FALSE | FALSE | TRUE | 8 | 6 |
| FALSE | TRUE | TRUE | 6 | 6 |
| TRUE | Any result | Any result | 4 | 6 |

If multi-test 19 comprises a combination test, then step 91 (FIG. 5) is executed. Assuming, as above, that t is set to a value 2, Combtest 41 is shifted left 2 positions, so that its final value is 0100. Step 93 is then executed giving an address equivalent to a physical address of the first branch label+4. Since do-block labels in the example multi-test sequence are spaced 4 addressable words apart, a jump of 4 words implies branching two do-blocks forward, which results in a branch to the label of the block of code created for the example case of (A>B=FALSE), (A>C=FALSE) and (A>D=TRUE).

Table V is an example of an assembly implementation illustrating a combination test branch applied to multi-test 19.

TABLE V

```
    Test A, B greater than, using Test-And-Condition
Instruction 26;
    Test A, C greater than, using Test-And-Condition
Instruction 26;
    Test A, D greater than, using Test-And-Condition
Instruction 26;
      Execute Combination-Test-Branch instruction 30
      ; Place code here for case of !(A>B) and !(A>C) and
!(A>D)
      :
      :
      jmp end
  label1:
      ; Place code here for case of !(A>B) and !(A>C) and
(A>D)
      :
      :
      jmp end
  label1+4:
      ; Place code here for case of !(A>B) and (A>C) and
!(A>D)
      :
      :
      jmp end
  label1+8:
      ; Place code here for case of !(A>B) and (A>C) and
(A>D)
      :
      :
      jmp end
  label1+12:
      ; Place code here for case of (A>B) and !(A>C) and
!(A>D)
      :
      :
      jmp end
  label1+16:
      ; Place here code for case of (A>B) and !(A>C) and
(A>D)
      :
      :
      jmp end
```

TABLE V-continued

```
label1+20:
    ; Place code here for case of (A>B) and (A>C) and
!(A>D)
    :
    :
    jmp end
label1+24:
    ; Place here code for case of (A>B) and (A>C) and
(A>D)
    :
    :
end:
```

Assuming a taken branch instruction uses 3 cycles, only 4 cycles are needed (including the jump) for a combination test using the example case of !(A>B) and !(A>C) and (A>D). A microprocessor implementing this combination test by methods known in the art typically requires 8 cycles (including the jump).

Table VI summarizes cycles used for various results of a combination test using the three-test example described hereinabove:

TABLE VI

| Conditions | | | Combination testing | |
|---|---|---|---|---|
| | | | Prior art | Table V |
| (A > B) | (A > C) | (A > D) | cycle count | cycle count |
| FALSE | FALSE | FALSE | 6 | 4 |
| FALSE | FALSE | TRUE | 8 | 6 |
| FALSE | TRUE | FALSE | 8 | 6 |
| FALSE | TRUE | TRUE | 10 | 6 |
| TRUE | FALSE | FALSE | 8 | 6 |
| TRUE | FALSE | TRUE | 10 | 6 |
| TRUE | TRUE | FALSE | 10 | 6 |
| TRUE | TRUE | TRUE | 12 | 6 |

It will be understood that Test-And-Condition statements for performing any specific multi-test may be interspersed with other statements, as is illustrated in FIG. 1. Alternatively, at least some of the Test-And-Condition statements may be contiguous, so that the statements are evaluated one directly after the other. Both contiguous and non-contiguous Test-And-Condition statements are to be considered as being within the scope of the present invention. It will be further understood that two or more Test-And-Condition statements may be incorporated into a single Multi-Test-And-Condition statement, the Multi-Test-And-Condition statement comprising all the tests which are the subject of the two or more Test-And-Condition statements. For example, referring to FIG. 1, the three Test-And-Condition statements at lines 101, 103, and 105 may be combined into a single statement Multi-Test-And-Condition A>B, A>C, A>D. Execution of the Multi-Test-And-Condition statement is substantially the same as sequential execution of lines 101, 103, 105, with lines 102, 104 absent, i.e., as if lines 101, 103, and 105 are contiguous. All such Multi-Test-And-Condition statements are to be considered as being comprised within the scope of the present invention.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A microprocessor, comprising:
    a plurality of registers including a priority-test-counter register and a combination-test-branch register,
    an instruction execution module, which processes a sequence of conditional tests, using an instruction set that comprises the following instructions:
        a test-and-condition instruction, which evaluates each of the conditional tests as true or false and responsive thereto, implements a modification of the registers comprising:
            at least one of;
                incrementing, or shifting contents of the priority-test-counter register; and
                shifting contents of the combination-test-branch register;
        a priority-test-branch instruction, which utilizes the contents of the priority-branch-register to branch to a priority code module;
        a combination-test-branch instruction, which utilizes the contents of the combination-test-branch register to branch to a combination code module.

2. The microprocessor according to claim 1, wherein at least one of the conditional tests comprises an expression a>b, where a and b are terms evaluated by the microprocessor.

3. The microprocessor according to claim 1, wherein at least one of the conditional tests comprises an expression a<b, where a and b are terms evaluated by the microprocessor.

4. The microprocessor according to claim 1, wherein at least one of the conditional tests comprises an expression a=b, where a and b are terms evaluated by the microprocessor.

5. The microprocessor according to claim 1, wherein the registers comprise a combination-test-branch register, and wherein the test-and-condition instruction implements a modification of contents of the combination-test-branch register for each conditional test having a result true, and wherein the modification comprises shifting the contents of the combination-test-branch register left by one bit and setting a least significant bit of the contents to one.

6. The microprocessor according to claim 1, wherein the registers comprise a combination-test-branch combination-test-branch register, and wherein the test-and-condition instruction implements a modification of contents of the combination-test-branch register for each conditional test having a result false, and wherein the modification comprises shifting the contents of the combination-test-branch register left by one bit and setting a least significant bit of the contents to zero.

7. The microprocessor according to claim 1, wherein the registers comprise a priority-test-branch counter register, and wherein the test-and-condition instruction implements a modification of contents of the priority-test-branch counter register for each conditional test having a result false, and wherein the modification comprises incrementing the contents of the priority-test-branch counter register by one.

8. The microprocessor according to claim 7, wherein the priority-test-branch counter register comprises a disable-next-priortest-flag and wherein for each conditional test having the result true the disable-next-priortest-flag is set to one, wherein said disable-next-priortest-flag is a flag that disables a next priority-test branch.

9. The microprocessor according to claim 1, wherein the microprocessor comprises a reduced instruction set computer (RISC) processor.

10. The microprocessor according to claim 9, wherein the RISC processor implements pipelining.

11. The microprocessor according to claim 1, wherein the registers comprise a combination-test-branch register having contents shifted left by a whole number t, wherein the combination code module has a combination-code-module address, wherein the combination-test-branch instruction executes a jump to the combination-code-module address, and wherein the combination-code-module address comprises a predetermined function of the whole number t.

12. The microprocessor according to claim 11, wherein the respective value of the contents is zero and wherein the combination-test-branch instruction and the combination-code-module address are consecutive.

13. The microprocessor according to claim 11, wherein the predetermined function comprises $2^t$.

14. The microprocessor according to claim 1, wherein the registers comprise a prior-test-counter-register having contents shifted left by a whole number t, wherein the priority code module has a priority-code-module address, wherein the priority-test-branch instruction executes a jump to the priority-code-module address, and wherein the priority-code-module address comprises a predetermined function of the whole number t.

15. The microprocessor according to claim 14, wherein the respective value of the contents is zero and wherein the priority-test-branch instruction and the priority-code-module address are consecutive.

16. The microprocessor according to claim 14, wherein the predetermined function comprises $2^t$.

17. The microprocessor according to claim 1, wherein the test-and-condition instruction comprises a first test-and-condition instruction and a second test-and-condition instruction which are non-contiguous and which evaluate respective conditional tests chosen from the sequence of conditional tests.

18. The microprocessor according to claim 1, wherein the test-and-condition instruction comprises a first test-and-condition instruction and a second test-and-condition instruction which are contiguous and which evaluate respective conditional tests chosen from the sequence of conditional tests.

19. The microprocessor according to claim 18, wherein the first test-and-condition instruction and the second test-and-condition instruction are written as a single multi-test-and-condition instruction which sequentially evaluates the respective conditional tests.

20. A method for processing a sequence of conditional tests in a microprocessor having registers, the method comprising:
evaluating each of the conditional tests using a microprocessor comprising:
a plurality of registers including a priority-test-counter register and a combination-test-branch register, and an instruction execution module, which processes the sequence of conditional tests, using an instruction set that comprises the following instructions:
a test-and-condition instruction, which evaluates each of the conditional tests as true or false and responsive thereto, implements a modification of the registers comprising:
at least one of:
incrementing, or shifting contents of the priority-test-counter register; and
shifting contents of the combination-test-branch register;
a priority-test-branch instruction, which utilizes the contents of the priority-branch-register to branch to a priority code module;
a combination-test-branch instruction, which utilizes the contents of the combination-test-branch register to branch to a combination code module.

21. The microprocessor according to claim 1, wherein at least one of the conditional tests comprises an expression a>b, where a and b are terms evaluated by the microprocessor.

22. The microprocessor according to claim 1, wherein at least one of the conditional tests comprises an expression a<b, where a and b are terms evaluated by the microprocessor.

23. The method according to claim 20, wherein at least one of the conditional tests comprises an expression a=b, where a and b are terms evaluated by the microprocessor.

24. The method according to claim 20, wherein the registers comprise a combination-test-branch register, and comprising, for each conditional test having a result true, shifting contents of the combination-test-branch register left by one bit and setting a least significant bit of the contents of the combination-test-branch register to one.

25. The method according to claim 20, wherein the registers comprise a combination-test-branch register, and comprising, for each conditional test having a result false, shifting contents of the combination-test-branch register left by one bit and setting a least significant bit of the contents of the combination-test-branch register to zero.

26. The method according to claim 20, wherein the registers comprise a priority-test-branch counter register, and comprising, for each conditional test having a result false, incrementing contents of the priority-test-branch counter register by one.

27. The method according to claim 26, wherein the priority-test-branch counter register comprises a disable-next-priortest-flag, and comprising setting the disable-next-priortest-flag to one for each conditional test having the result true, wherein the disable-next-priortest-flag comprises a flag that disables the priority test branch.

28. The method according to claim 20, wherein the microprocessor comprises a reduced instruction set computer (RISC) processor.

29. The method according to claim 28, wherein the RISC processor implements pipelining.

30. The method according to claim 20, wherein the registers comprise a combination-test-branch register having contents shifted left by a whole number t, wherein the combination code module has a combination-code-module address comprising a predetermined function of the whole number t, and comprising executing a jump to the combination-code-module address.

31. The method according to claim 30, wherein the respective value of the contents is zero and wherein the combination-test-branch instruction and the combination-code-module address are consecutive.

32. The method according to claim 30, wherein the predetermined function comprises $2^t$.

33. The method according to claim 20, wherein the registers comprise a prior-test-counter-register having contents shifted left by a whole number t, wherein the priority code module has a priority-code-module address comprising a predetermined function of the whole number t, and comprising executing a jump to the priority-code-module address.

34. The method according to claim 33, wherein the respective value of the contents is zero and wherein the priority-test-branch instruction and the priority-code-module address are consecutive.

35. The method according to claim 33, wherein the predetermined function comprises $2^r$.

36. The method according to claim 20, wherein evaluating each of the conditional tests as true or false comprises evaluating at least two of the conditional tests as if the tests are non-contiguous.

37. The method according to claim 20, wherein evaluating each of the conditional tests as true or false comprises evaluating at least two of the conditional tests as if the tests are contiguous.

38. The method according to claim 37, wherein evaluating each of the conditional tests comprises incorporating the at least two of the conditional tests into a single multi-test-and-condition instruction which sequentially evaluates the respective conditional tests.

39. The microprocessor according to claim 1, wherein the test-and-condition instruction comprises modifying the contents of the priority-test-counter register.

40. The microprocessor according to claim 1, wherein the test-and-condition instruction comprises modifying the contents of the combination-test-branch register.

41. The microprocessor according to claim 1, wherein the test-and-condition instruction comprises setting the contents of the combination-test-branch register.

42. The method according to claim 20, comprising modifying the contents of the priority-test-counter register by the test-and-condition instruction.

43. The method according to claim 20, comprising modifying the contents of the combination-test-branch register by the test-and-condition instruction comprises.

44. The method according to claim 20, comprising setting the contents of the combination-test-branch register by the test-and-condition instruction comprises.

\* \* \* \* \*